July 10, 1934.　　C. H. KRAFT ET AL　　1,965,841
WARDROBE DOOR AND OPERATING MECHANISM THEREFOR
Filed Sept. 8, 1931　　9 Sheets-Sheet 4

Fig. 6

INVENTORS,
Charles H. Kraft
Roy E. Gearhart.
BY
Hovey & Hamilton,
ATTORNEYS.

July 10, 1934.   C. H. KRAFT ET AL   1,965,841
WARDROBE DOOR AND OPERATING MECHANISM THEREFOR
Filed Sept. 8, 1931   9 Sheets-Sheet 9

INVENTORS.
Charles H. Kraft.
Roy E. Gearhart.
BY
ATTORNEYS.

Patented July 10, 1934

1,965,841

UNITED STATES PATENT OFFICE 1,965,841

WARDROBE DOOR AND OPERATING MECHANISM THEREFOR

Charles H. Kraft and Roy E. Gearhart, Kansas City, Mo., assignor, by mesne assignments, to Koch Butchers Supply Company, a corporation of Missouri Application September 8, 1931, Serial No. 561,691

9 Claims. (Cl. 268—19)

This invention relates to wardrobes having motor driven doors which is especially adapted for school rooms or similar places where children congregate and where the element of safety is a factor. In wardrobes of this type which are for use in school rooms or the like where children deposit their wraps it is very essential that the movable parts be so provided with safety means which will preclude to a large degree the possibility of accidental injury to the children. Furthermore, the doors of the wardrobe must be adapted to be closed manually, as well as by motor power, since in certain emergencies the slower motor closing operation might interfere with the quick exit of the children due to the fact that the doors, when open, are positioned in the path of travel.

The principal object of this invention is the provision of a wardrobe or the like having a plurality of doors mounted for oscillation, means for moving said doors to or from the closed position, said means having resilient release parts whereby the doors may be retarded or stopped in their movement as the oscillating means completes its predetermined movement.

A further object of this invention is the provision of a wardrobe having a pair of doors pivotally mounted for oscillatory movement and means for moving said doors to or from the closed position, one ahead of the other.

Another object of this invention is the provision of a wardrobe having motor operated doors, said motor operating means being releasable to permit free manual operation of said doors.

A further object of the instant invention is the provision of a wardrobe having series of oscillatory doors, each door having means whereby it is independently adjustable.

Another object of this invention is the provision of a wardrobe having two series of doors and means operable to move said series of doors at different and varying speeds during the opening and closing thereof.

A still further object of this invention is the provision of a wardrobe having a plurality of doors and a motor driven means operable to open and close said doors, said means adapted to be positioned to permit operation of all of said doors by moving one of the same.

Further objects of this invention are simplicity and ease of operation, automatic adjustability of parts to preclude possibility of injury to children and further adjustability to permit proper positioning of the doors when installed and alinement of the doors as the building structure changes.

Other objects will appear during the course of the detailed specification in which reference will be made to the drawings, wherein.

In the drawings similar parts are designated by like numerals and the number 20 indicates a wardrobe or the like having a suitable door frame or casing 21, which extends substantially across one side of the wardrobe. This casing is adapted to receive doors 22, 23, 24, 25 and 26, which when in the closed position, serve as an outer wall for the wardrobe, and when in the open position, permit easy access to the wardrobe throughout its entire length. These doors are arranged in pairs which open and close in opposite directions. As shown in the drawings, an odd number of doors may be used in certain cases and when so used, the last door will open inwardly and will not have a companion door. It will be noted that the doors are independently mounted at 27 and 28 adjacent, but spaced apart from, one edge thereof on a vertically disposed axis so that they may be oscillated horizontally.

Figure 6:
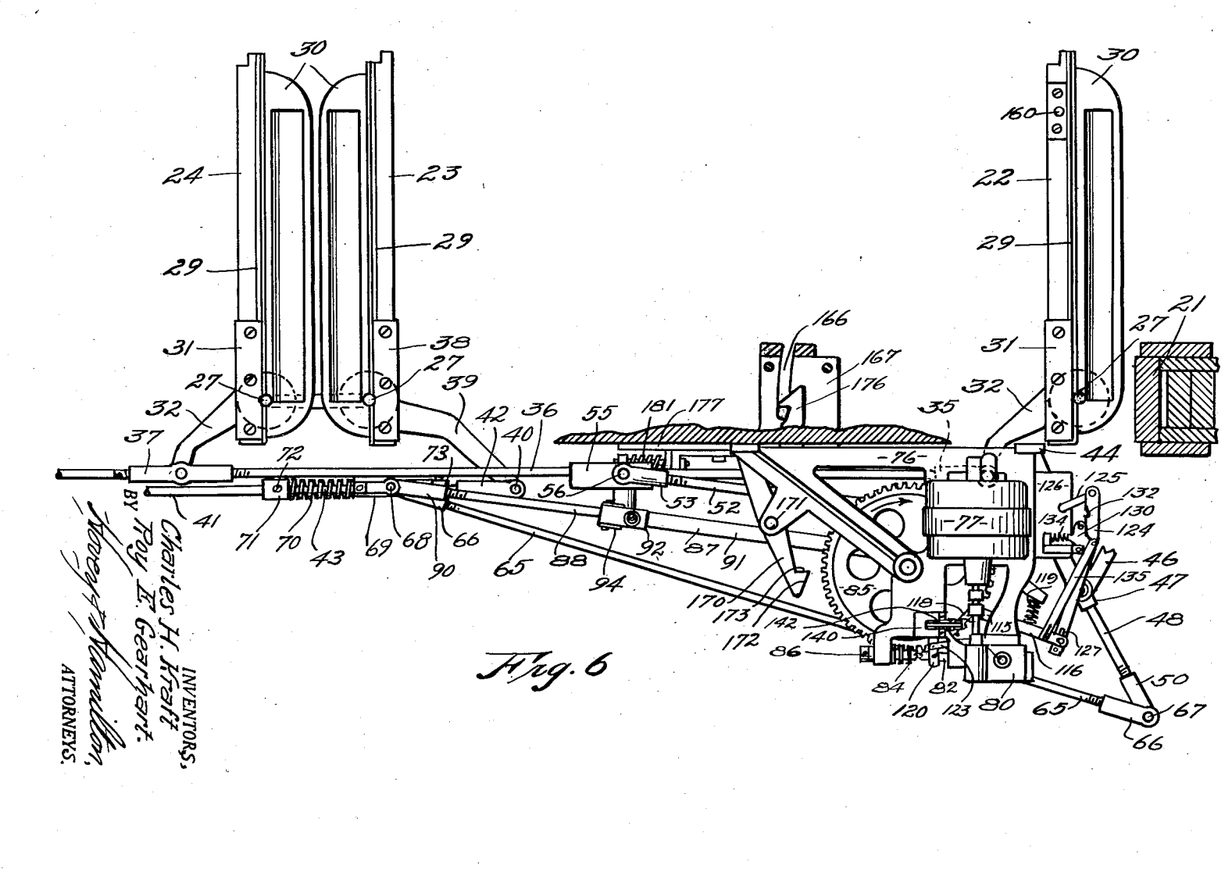
Fig. 6 is a plan view similar to that shown in Fig. 4, but with the doors in the open position.

The pivotal members 27 and 28 may be adjustable so as to permit proper and independent vertical adjustment of each door. The wardrobe adapted for general use in school rooms which is shown in the drawings, has doors which are provided at their outer top portions with blackboards 29 and chalk rails 30, and it is therefore essential that adjacent doors of adjoining pairs be pivoted in such spaced apart relation that when the doors are in the fully open position, as shown in Fig. 6, the chalk rails of adjacent doors will be in substantially contacting relation, while the doors of each pair will be spaced apart a maximum distance to permit easy access therebetween to the wardrobe. Corresponding doors of the pairs are arranged as hereinafter described to open and close in the same direction and at the same rate of speed, while the other corresponding doors of the pairs also open and close in the same direction and speeds, but in the opposite direction and at a different rate of speed than that of the first mentioned doors.

This difference in the speed of travel of the even and odd doors permits the use of pairs of doors that overlap at their adjacent edges because one door of the set may be moved to the closed position ahead of its companion door. When this type of door is used it is easier to maintain them in proper alined relation. However, it is apparent that the operating mechanism hereinafter described might be used on ordinary abutting doors. Each of the doors 22, 24, and 26 is provided with a rigidly attached bracket 31 at its upper edge adjacent the pivotal point 27, each bracket 31 being provided with an inwardly extending arm 32 to which is pivotally attached at 33 a common operating rod 34, built up of threaded end socket members 35, rods 36 and intermediate double-ended threaded socket members 37.

Each rod 36 is provided with a right and left hand thread as shown, adapted to engage the threaded sockets so that each of the doors of this set, or series, can be independently adjusted without interfering with any of the other doors, thus making it possible to take care of inaccuracies which may develop in the wardrobe structure.

Doors 23 and 25 are likewise operatively connected to move in unison and are each provided with a bracket 38 having an inwardly extending arm 39 to which is pivotally connected at 40 a common operating rod 41, made up of single threaded socket members 42 and rod 43. This rod is threaded at its opposite ends respectively, on which is operatively mounted socket members 42 so that when they are turned in either direction the door directly connected thereto will be moved relative to the other doors of the set. For convenience, only two doors have been shown in this set. However, many more may be installed, in which case it would be necessary to use double-threaded sockets corresponding to sockets 37 of the even series. Also, a plurality of rods 43 would necessarily be required.

Figure 8:
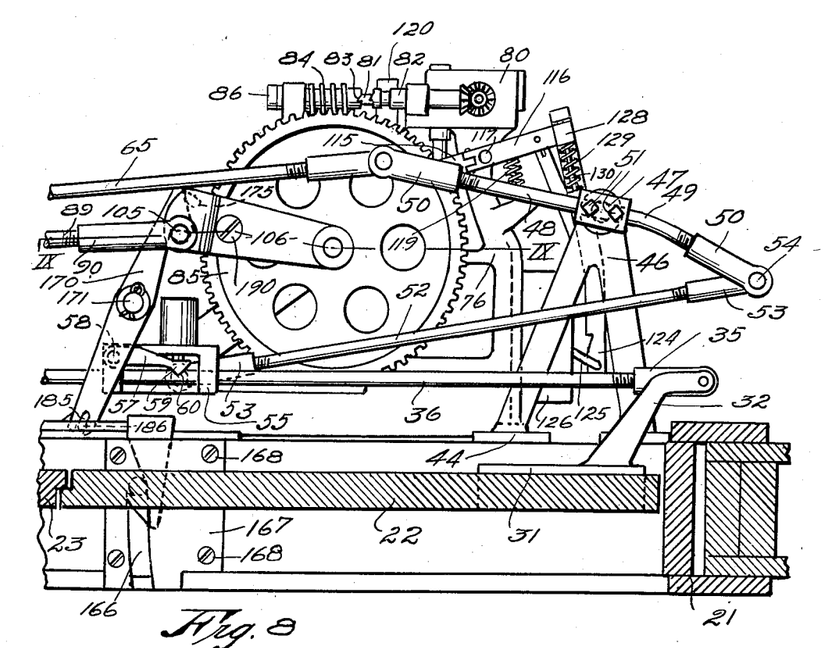
Fig. 8 is an inverted, fragmentary, sectional, plan view including the power unit.

It will be noted that corresponding doors of the several pairs have a common operating rod so that to operate the doors of the pairs in opposite directions it is necessary to move these operating rods in opposite directions. For this purpose the following mechanism is provided. A bracket 44 is rigidly secured to the casing 21 by means of bolts 45 and has an inwardly extending arm 46, which in turn carries a rotatably mounted sleeve 47, in which is slidably mounted a longitudinally adjustable operating rod 48. As clearly shown in Fig. 8, this rod is provided at its opposite ends with right and left threads respectively and for the purpose of off-setting the opposite ends thereof from a common diametrical link the rod is horizontally bent at 49. Threaded socket members 50 are adjustably mounted on rod 48 for longitudinal movement thereon. Set screws 51 are provided to maintain rod 48 in a predetermined fixed relation to sleeve 47.

Figure 5:
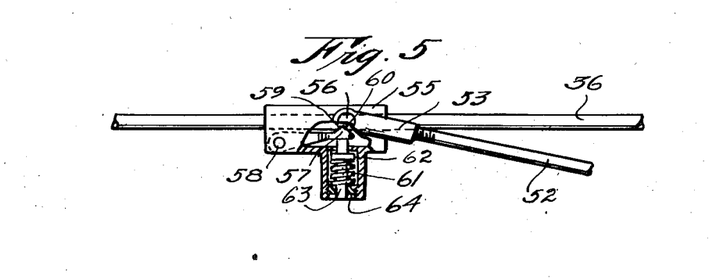
Fig. 5 is an enlarged, fragmentary, plan view partly in section, showing one of the drive release devices.

An operating rod 52, threaded in opposite direction at its ends respectively is provided with threaded socket members 53, adjustable to or from each other by rotating the rod 52. One of the members 53 is pivotally secured to one of the sockets 50 by means of a pin 54, while the other end thereof is pivotally mounted on sleeve 55 at 56. This sleeve is normally mounted in position on rod 36 against longitudinal movement thereto by an adjustable release means clearly shown in Fig. 5. Sleeve 55 is provided with a dog 57, pivoted thereto as at 58, and provided at its free end with a detent 59, adapted to fit into a V-notch 60, formed in rod 36. A spring 61 mounted against a collar 62, stationary on a slidably mounted pin 63, has one end thereof positioned against an adjustable threaded collar 64, carried by sleeve 55. The inner end of pin 63 rests against detent 59, and by means of the threaded collar 64 which may be moved to vary the tension of said spring, any predetermined tension may be exerted on 59 to frictionally grip the rod 36 so that under normal conditions rod 36 and sleeve 55 will be maintained in fixed relation, but should a sufficient resistance be exerted against the doors or otherwise to prevent longitudinal movement of rod 36, then the detent 59 would be forced out of notch 60 and sleeve 55 would be moved along rod 36 as the same remains in a stationary position.

This arrangement and construction of parts, serves as a safety device to preclude, to a large degree, the possibility of injury to children that might get in the path of the moving doors. The operation of the odd series of doors 23 and 25, simultaneously moved by the rod 41 and in a direction opposed to the movement of the even doors, is accomplished by means of a connecting rod 65, provided with right and left hand threads at its opposite ends respectively, on which are mounted threaded sleeve members 66.

For adjusting the distance between these sleeve members, it is only necessary that the rod be turned in sleeve 66. One end of rod 65 is pivoted to sleeve 66. One end of rod 65, through the intermediacy of sleeve 66, is pivoted to 48 by means of pin 67, while the other end thereof is pivotally attached by pin 68 to the sleeve member 69. A compression spring 70 is mounted on rod 41 with the inner end thereof abutting against the outer end of sleeve 69, while its outer end engages a set collar 71, secured to rod 41 by the set screw 72. By moving the set collar toward or from the sleeve, the tension of spring 70 may be varied. The inner end of sleeve 69 also abuts against a set collar 73 which is adjustably mounted on rod 41. With this construction of door operating parts, it is evident that when power is applied to either of the operating rods, all of the doors will be moved, the even doors in one direction at a uniform rate of speed and the odd doors in the opposite direction and at a rate of speed differing from that of the even doors. The operating rod 48 to which operating rods 36 and 65 are attached is so positioned when the doors are in the closed position that the doors 22, 24 and 26 which have the overlapping edges will immediately start moving when the rod 48 is oscillated, while the doors 23 and 25 will remain stationary in the closed position until the even doors have moved through a considerable distance.

Figure 4:
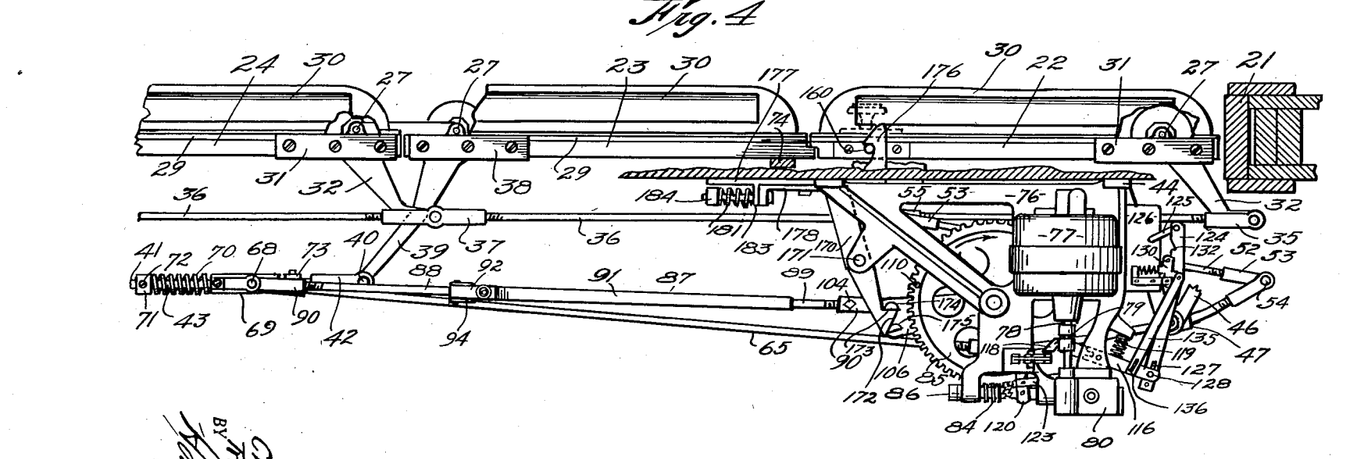
Fig. 4 is a plan view partly in section of a portion of the wardrobe, including the power unit.
Figure 7:
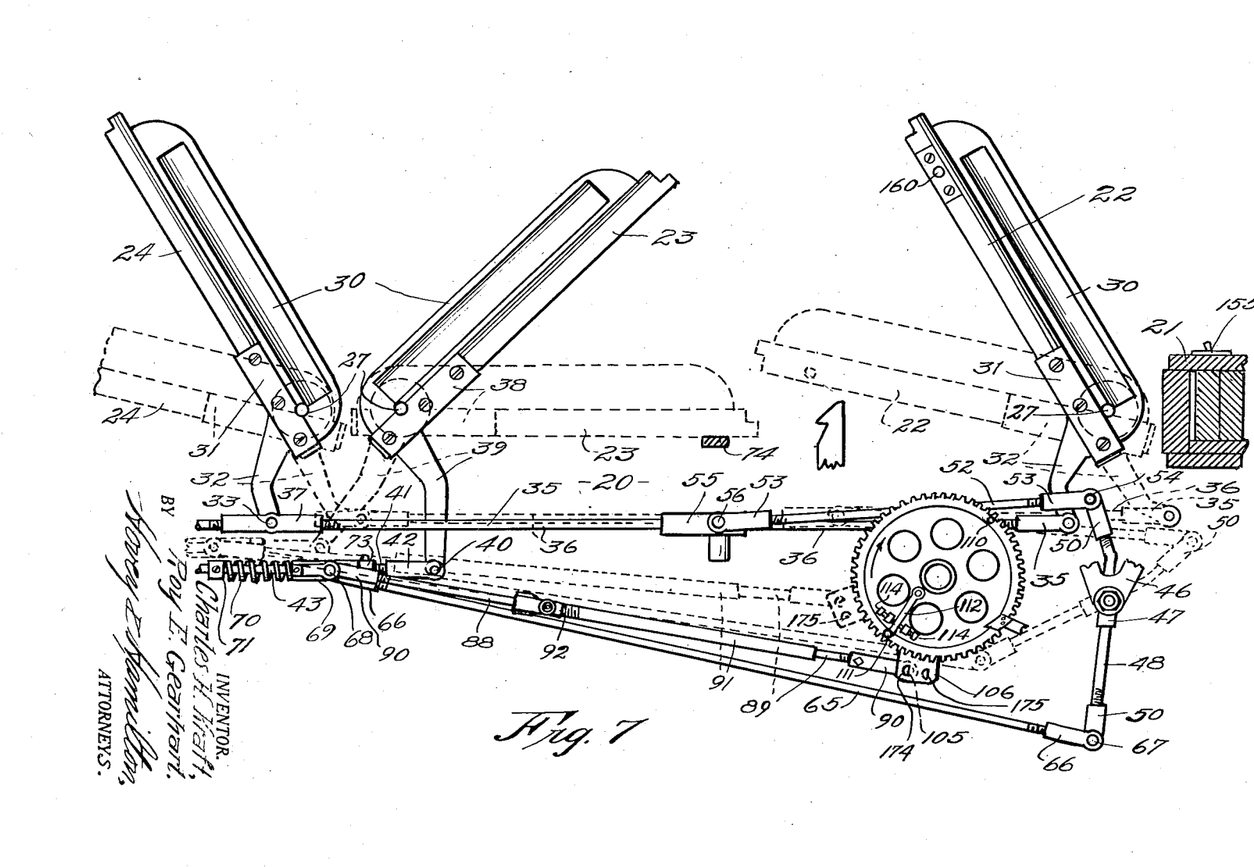
Fig. 7 is a fragmentary, plan view with parts removed for clearness, showing the doors in an intermediate position in solid lines while in dotted lines the odd doors are shown in the completely closed position and the even doors are slightly opened.

This difference in movement of the even and odd doors is due to the position of sleeve 69 relative to collar 73, permitting a slight movement of rod 65 before movement is imparted to rod 41, which operates the odd doors. In Fig. 4 it will be noted that the doors are in the closed position and that the sleeve 69 is spaced apart from the collar 73, while in Fig. 7 where door 23 has been moved to the closed position ahead of the even doors, 69 and 73 are in contacting relation so that as 65 is moved forward in closing the even doors, the spring 62 will be compressed and the parts 69 and 73 will be separated.

Thus a spring tension will be exerted on the odd doors to maintain them in the closed position against the stops 74. By adjusting the operating rods to the proper length, and also the parts just described, it is evident that all the doors may be so adjusted that when they are moved to the closed position they will be in substantially a common plane, and will effectually close the wardrobe.

Doors mounted and interconnected as described above are all operable by opening or closing any one of the doors and by securing any one of the even doors in the closed position as hereinafter described, it is apparent that all the doors will be secured.

While this door operating mechanism is adapted to be operated manually, yet it is desirable in some instances to provide motor driven means for its operation and it is for this purpose that the following power unit is provided. Securely mounted on casing 21 by means of screws or bolts 75 is a suitable bracket 76 on which is carried a motor 77. While an electric motor is shown in this instance, it is apparent that any other of the well known motors might be used. Motor shaft 78 is connected by a coupling 79 with a shaft of the speed reducing unit 80 which is mounted on bracket 76. This speed reducing unit may be of any of the well known commercial types and has a driving shaft 81 which is driven at a relatively low speed, and to which suitable connections may be made to drive moving parts. Mounted on shaft 81 is a clutch member 82, rotatable therewith, but longitudinally movable therealong, which is adapted to engage and disengage a clutch member 83 which is integral with a worm 84, rotatably mounted on shaft 81 and in operative relation with a horizontally mounted worm gear 85 so that when the motor is running and the clutch members are in engagement, the worm gear will be driven in the direction indicated by the arrow.

Figure 1:
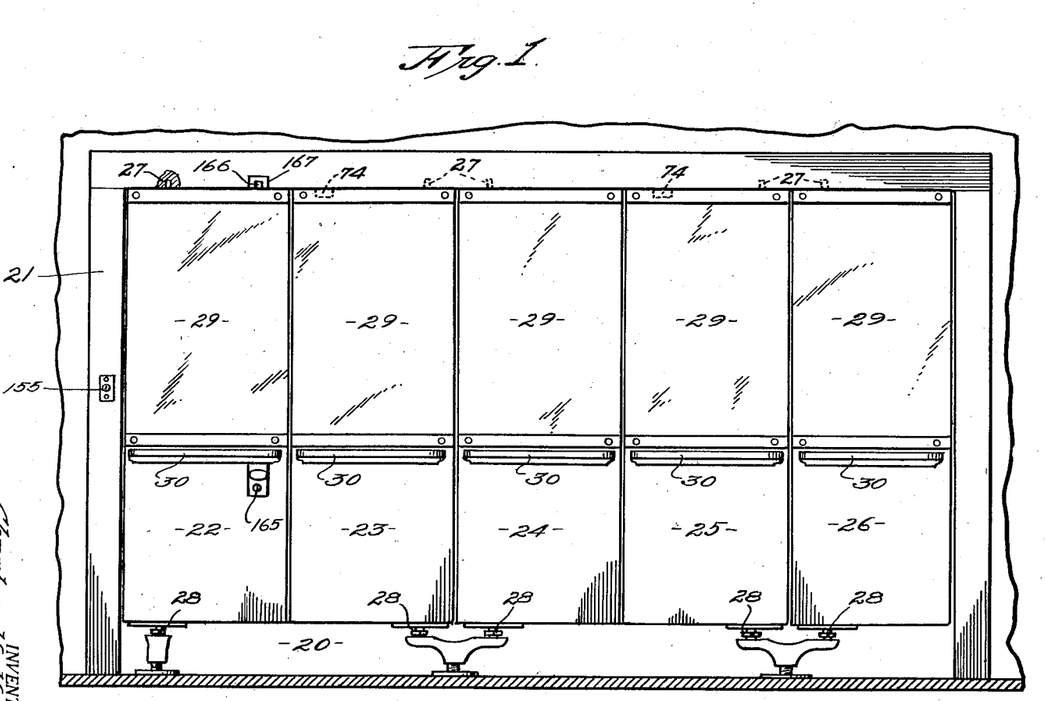
Figure 1 is a front elevation of a wardrobe showing the doors thereof in closed position, and embodying this invention.
Figure 2:
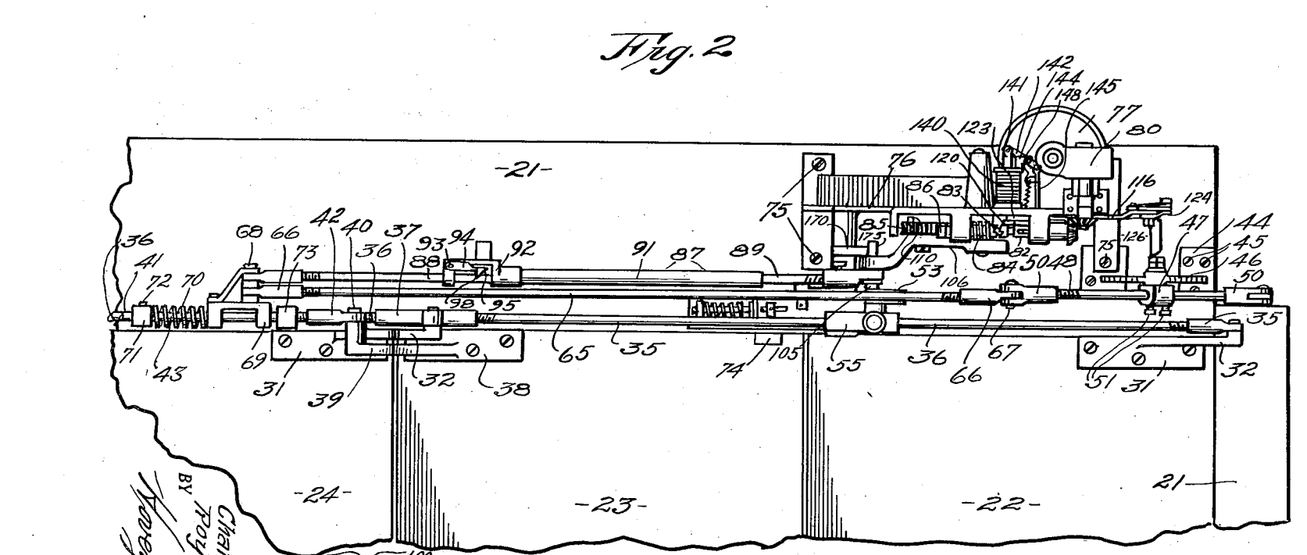
Fig. 2 is an enlarged, fragmentary, inside elevation of the wardrobe showing the major part of the operating mechanism.
Figure 3:
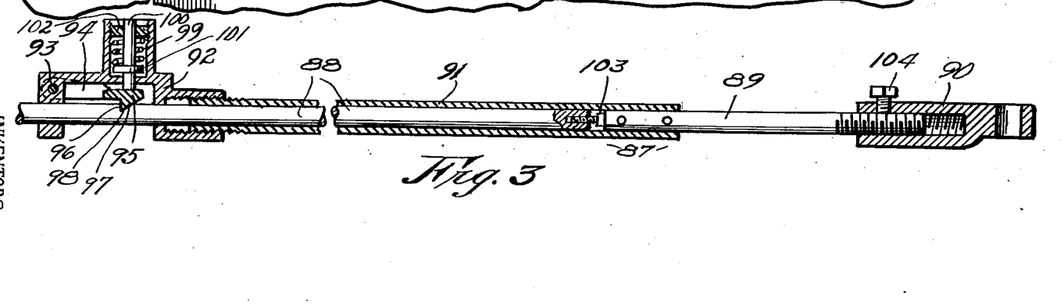
Fig. 3 is an enlarged, fragmentary, sectional view of the pitman or driving rod.

To prevent undue friction of the parts a thrust bearing 86 is provided to take care of the metal worm thrust. Worm gear 85 serves as a pitman wheel to drive the pitman rod 87 which engages the drive rod 41 through the intermediacy of pin 68, sleeve 69, spring 70, collars 71 and 73. Pitman rod 87 consists of threaded rods 88 and 89, threaded socket members 90, a sleeve 91 to which rod 89 is rigidly affixed, and in which rod 88 is slidably mounted; also a resilient means as clearly shown in Fig. 3 whereby the rod 88 is held against relative movement in sleeve 91. Threaded on sleeve 91 is a sleeve member 92, to which is pivotally mounted at 93, a dog 94, having a detent 95 that is provided with a straight surface 96 and an inclined surface 97, and is adapted to snugly fit into a notch 98 formed in shaft 88. To resiliently maintain detent 95 in operative engagement with shaft 88, a spring 99 is positioned on pin 100 and against collar 101, formed thereon, and a threaded sleeve 102 which is adjustable to vary the tension of said spring.

During the closing operation of the doors it will be noted that the pitman rod is moving outwardly from the worm gear, and the rod 88 will be positively driven forward by the straight side of the detent 95 engaging the straight side 96 of the notch 98. Furthermore, an adjustable stop member 103 may be provided which will take a part or all of the end thrust during the door closing operation. When the doors are being opened it is apparent that should a predetermined resistance be exerted against the moving doors, then the rod 88 would remain stationary and the detent would be disengaged from notch 98 so that the doors would be stationary as the power unit completed its movement.

When thus disengaged, the doors are free to be moved manually to any desired position. To prevent accidental movement of rod 89 in socket 90, a set screw 104 is provided. The socket member 90, to which rod 89 is attached, is pivotally mounted at 105 on plate 106, secured to the under side of worm gear 85 and extending therebelow a sufficient distance to allow proper alining of the parts.

Figure 9:
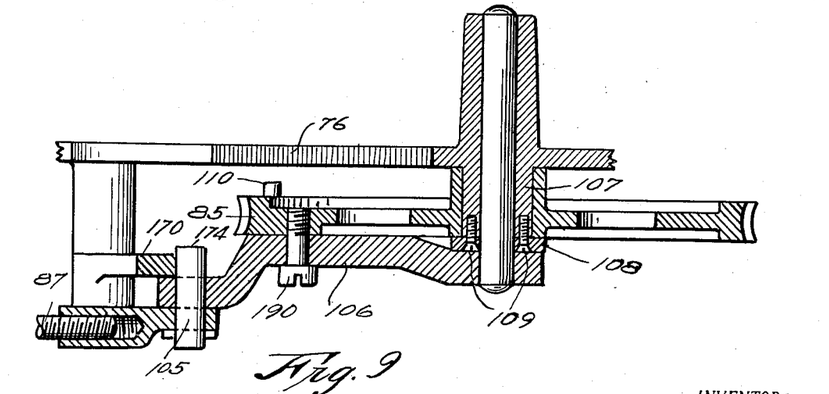
Fig. 9 is an enlarged, sectional view taken on line IX—IX of Fig. 8.

Referring to Fig. 9, wherein the mounting of worm gear 85 is clearly shown, it will be noted that the downwardly extending hollow axle 107 fits the bore of the worm gear 85 and the plate 108 is affixed to 107 by screws 109, thereby securing said gear in a fixed rotary position on said axle.

Figure 10:
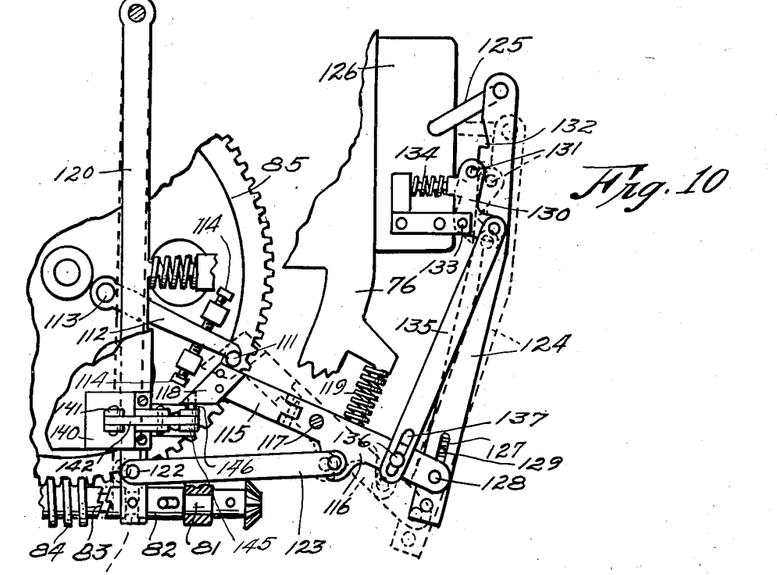
Fig. 10 is an enlarged, fragmentary, plan view of the switch operating device and its connecting parts.
Figure 11:
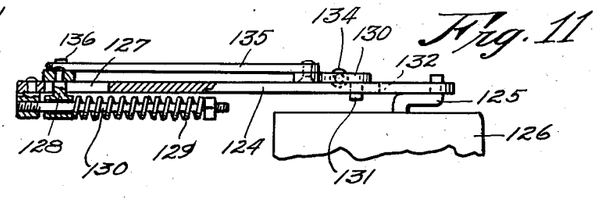
Fig. 11 is a side elevation, partly in section, of the switch operating parts.
Figure 12:
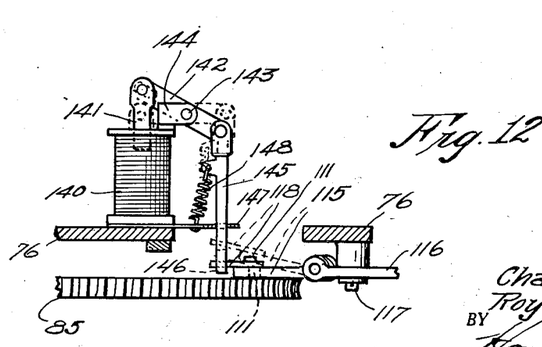
Fig. 12 is an enlarged elevation, partly in section, of the electrical release mechanism.

The operations of opening and closing the doors require opposite movements of the pitman rod 87 and therefore it is evident that each operation must be effected by substantially one-half revolution of the worm or pitman gear. Also, when the desired travel is accomplished, it is necessary that the motor be stopped. For this purpose the following mechanism, best shown in Figs. 10, 11 and 12, is provided. Mounted on the top side and adjacent the periphery of gear 85 is a stop pin 110 and, substantially diametrically opposed thereto is an adjustable stop pin 111 mounted on a lever arm 112 pivoted to gear 85 at 113. Adjusting screws 114 are carried by gear 85 and positioned respectively on opposite sides of lever 112 in such a manner as to permit of a slight movement thereof to adjust the pin 111. Stop pins 110 and 111 are adapted to engage the horizontally pivoted pin 115 of a lever 116, pivotally mounted for horizontal oscillation intermediate its ends to the bracket 76 by means of pin 117. The horizontally pivoted pin 115 rests on the upper face of gear 85 and is provided with a hardened ware plate 118 extending beyond 115 and above the face of gear 85.

Lever 116 is normally held in the position shown in dotted lines, Fig. 10, due to the action of a compression spring 119 which abuts against bracket 76. This dotted position of the parts also shows the clutch members 82 and 83 in interengaged relation while the electrical switch for the motor is shown in the closed position. For operating the clutch, a clutch operating lever 120, pivotally mounted on bracket 76, extends above clutch member 82 and engages a groove 121 formed therein in such a manner that when oscillated, it will move the clutch member longitudinally, but will not interfere with its rotary movement. Pivoted to lever 120 at 122, and at its other end to lever 116, is a link 123. This link maintains the clutch in engagement with lever 116 as is shown in dotted lines and in the disengaged position as is shown in full lines. Attached to the outer end of lever 116 is a switch operating arm 124, pivotally attached to the switch lever 125 extending from switch box 126. To insure a quick acting switch in one direction, arm 124 is slotted at 127 and member 128 carried by lever 116 extends therethrough to engage one end of a compression spring 129, while the other end of said spring is rigidly attached to 124 by means of an adjustable member 130.

When the switch is in the closed position arm 124 is held in position by the pin 131 mounted on one arm of a bell-crank lever 130', and which engages a notch 132 formed in arm 124. Lever 130' is pivotally mounted at 133 to the switch box. Compression spring 134 is positioned to press against one arm of lever 130' to hold pin 130 in notch 132.

An operating link 135 is mounted at one of its ends to bell-crank lever 130' and is slidably connected at its other end to lever 116 by means of pin 136 attached to 116 and extending through slot 137, formed in 135. The operation of these parts is as follows: When in the position shown in dotted lines, as in Fig. 10, the stop pin 111 engages 115 and moves it forward toward the solid line position so that arm 124 is held against longitudinal movement by pin 131 engaging notch 132 and spring 129 is compressed until pin 136 reaches the end of slot 137 and forces link 135 to oscillate bell-crank lever 130', thereby moving pin 131 out of notch 132. The compressed spring 129 then forces arm 124 outwardly to throw switch lever 125 to the off position. This quick acting switch movement precludes to a large degree, the danger of destroying the switch contact points.

When the switch is opened by moving from the dotted position to the solid line position, as shown in Fig. 10, pin 111 is disengaged from 115 as hereinafter described and the compression spring 119, through the connecting parts, operates to throw the switch to the closed position where it remains until pin 110 is again moved through substantially one hundred eighty degrees to engage 115.

The release of lever 115 from pin 110 or 111 is effected electrically by a suitable solenoid 140 having a movable core 141 pivoted to one end of a lever 142 which in turn is pivoted at 143 to a bracket 144 carried by the solenoid. Pivotally depending from the outer end of lever 142 is an operating arm 145 having an outwardly angled end portion 146, above which plate 118 passes when it is moved forward by the action of pins 110 and 111. When so positioned, as shown in solid lines of Fig. 10, and the current is supplied to solenoid 140, the core 141 will be operated to oscillate 142 and thus raise arm 145 so that its angled portion 146 will raise 115 to a position above pin 111, thus permitting spring 119 to expand to carry lever 116 to its normal position, as shown in dotted lines. Also, the switch mechanism at the same time will operate to throw the switch to the on position, as described above.

The switch remains closed until pin 110 is moved to operate lever 116 and cause the switch to be opened. Arm 145 is maintained in operating position by means of a guide plate 147, and is normally held in the down position, as shown in dotted lines in Fig. 12 by an expansion spring 148 attached thereto and to guide 147.

Figure 16:
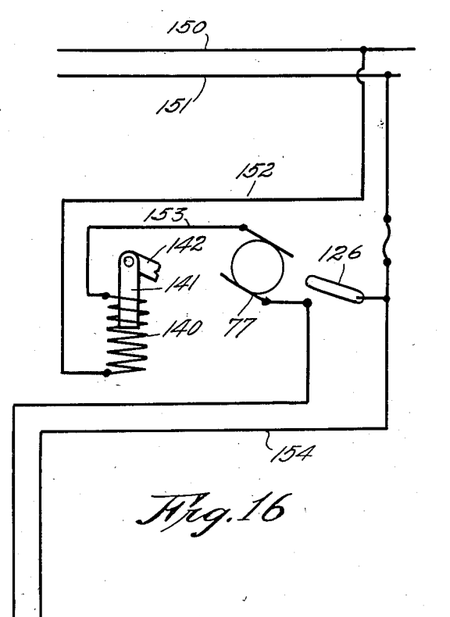
Fig. 16 is a diagrammatical view of the electric current used in the wardrobe mechanism, as shown.

A diagrammatical view of the electric circuit is shown in Fig. 16, in which 150 and 151 are lead wires from any suitable electrical source not shown; 152 is a conductor joining 150 to the wall of solenoid 140. The other end of said coil is connected by wire 153 to motor 77, which in turn is electrically connected to conductor 154. This conductor 154 connects with lead wire 151 through switch 155. This switch may be positioned on the door casing as shown, or at any other point that may seem most desirable for the particular installation. For the protection of the electrical appliances, a fuse 156 is inserted in conductor 154. Intermediate switch 155 and lead wire 150 the motor 77 may be connected with conductor 154 through a switch 126, which when closed, conducts the current to the motor independently of switch 155. In this circuit the solenoid and motor are always in series and any current passing through the motor must necessarily pass through the solenoid. When starting the motor the operator closes switch 155 and the heavy current necessary to start the motor is sufficient to energize the solenoid coil and operate the core, thus causing the mechanism to close switch 126. The solenoid is so wound that when the motor is running at normal speed the electric current necessary to then drive the motor is not strong enough to operate the solenoid which will remain inactive until the motor is again started, as above described.

Figure 13:
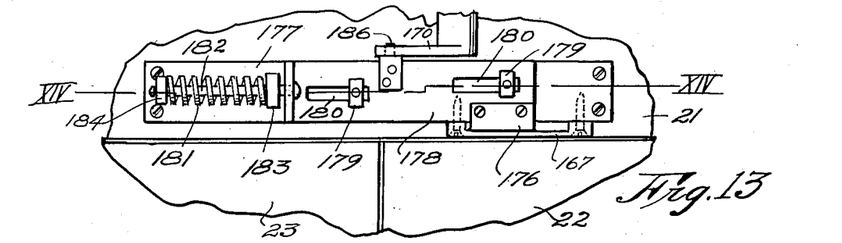
Fig. 13 is an enlarged elevation of a part of the door latch mechanism shown in the latched position.
Figure 14:
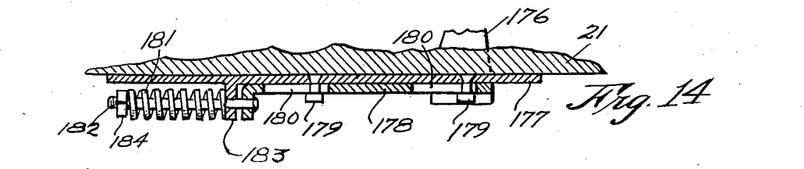
Fig. 14 is a horizontal, sectional view taken on line XIV—XIV of Fig. 13.
Figure 15:
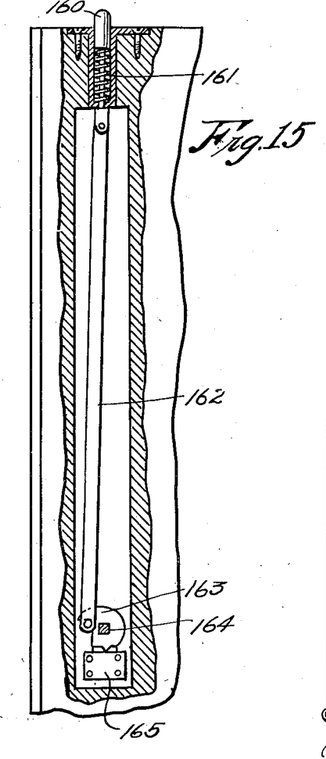
Fig. 15 is an enlarged, fragmentary elevation of one of the doors showing a suitable latching member.

When the doors are in the closed position it is essential that they be so secured against accidental or manual agencies except by means of a special hand-operated mechanism hereinafter described. To lock all the doors it is only necessary to secure door 22 in the closed position and this is accomplished by the following mechanism. Door 22 is provided at its upper edge with an upwardly extending bolt 160, maintained in the raised or operative position by means of a compression spring 161. Pivotally attached to the lower end of bolt 160 is an operating link 162, positioned to be manually operated by a crank 163 carried by the knob connecting bar 164. Crank 163 may be locked against movement by a suitable lock 165. When door 22 is moved to the closed position, bolt 160 moves into slot 166 formed in plate 167, which is rigidly attached to casing 21 by means of screws 168. A latching mechanism, parts of which are clearly shown in Figs. 13 and 14, is adapted to engage bolt 160 and secure the doors against outward movement. An operating lever 170, pivotally mounted intermediate its ends on the lower side of brackets 76 at 171, is provided at its inner end with a cam surface 172 and a notch 173. Lever 170 is adapted to be intermittently oscillated in one direction by the action of pins 174 and 175, mounted on the upper surface of plate 106 beyond the periphery of worm wheel 85 in the manner hereinafter described. The latch member 176 is mounted for reciprocatory movement on plate 177 by means of slide plate 178, held in operative position by means of members 179 which extend through slots 180, formed through plate 178. Compression spring 181 is positioned on rod 182 and engages abutment 183 which is carried by plate 177 and also against an adjustable nut 184, affixed to rod 182. Rod 182 is rigidly attached to slide plate 178 in such a manner that the action of spring 181 normally tends to hold the latch 176 under tension in the latched position.

This member 176 is so positioned above the plate 167 as to engage bolt 160 when door 22 is in the closed position. However, it is apparent that when the knob operating mechanism is turned, bolt 160 may be moved downwardly out of the path of the latching member, thereby releasing the doors. The outer end of lever 170 is bifurcated at 185 and operatively engages pin 186, carried by slide plate 178. Since the latch member 176 is normally operated by the motor driven parts and it is necessary that the latch 176 be out of engagement with bolt 160 before the door 22 starts to open, it is essential that the operating pins 174 and 175 be positioned rearwardly of the line joining the axes of the pin 68 and worm gear 85 so that as the motor moves gear 85 in the direction indicated by the arrow, no outward movement of the doors will be obtained until after the latch member 176 has been moved out of the path of bolt 160.

Figure 17:
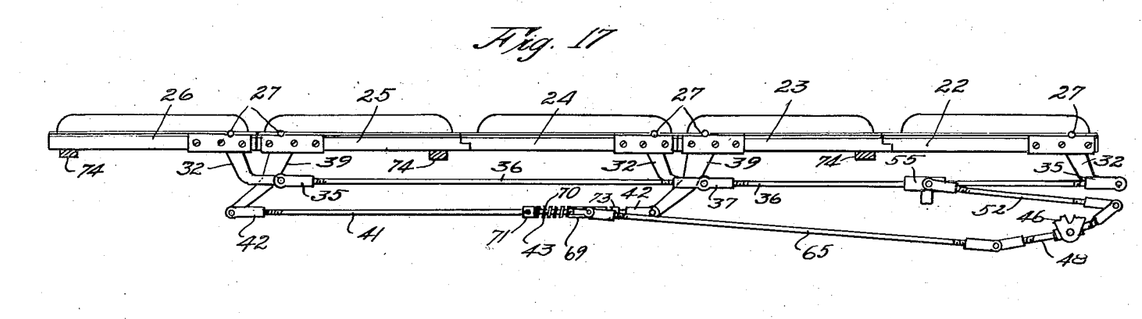
Fig. 17 is a diagrammatical view of the doors and operating mechanism as used when the motor unit is removed, and, Fig. 18 is a view similar to that shown in Fig. 17, but with the doors moved to the open position.
Figure 18:
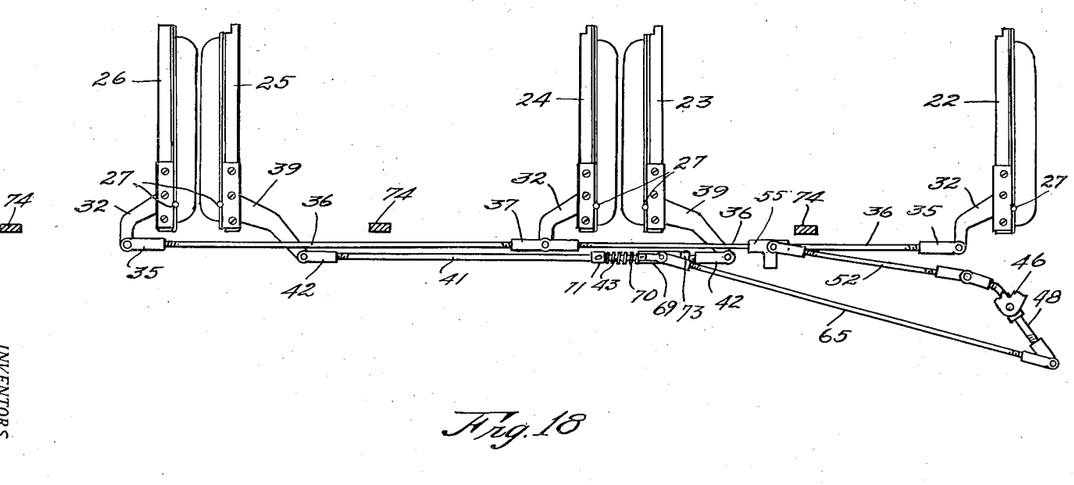

During the door closing operation, pin 174 engages cam surface 172 to move the latch member 176 out of the path of bolt 160 and after the doors are closed, pin 174 will drop into notch 173 and latch 176 will be moved into position to engage bolt 160. This mechanism permits of the free movement of the doors when the motor is in operation and also prevents manual opening of the doors except by means of the locked control device described above. When the motor unit is removed for any reason, or becomes inoperative, the doors may be manually operated through the use of that portion of the mechanism shown in Figs. 17 and 18. Furthermore, in some instances, it might be advisable to make installations wherein only the manually controlled features of this invention are embodied.

In cases where the motor driven mechanism becomes inoperative for any reason, and especially when it is impossible to rotate gear 85 to the open position, provision is made whereby plate 106 may be released and rotated to the desired position independently of said gear. This is accomplished by removing screw 190 which secures the plate to the gear. When thus released, the plate 106 may be rotated on its central pivotal point. In place of screw 190, any releasable detent may be substituted for the purpose of convenience in operation.

With the above described door operating mechanism it is impossible to slam the doors or to move them at a too rapid rate of speed, due to the fact that the release device will operate to disengage the doors from the driving force. The control switch 155 may be remotely positioned to control the operation of the doors or a plurality of switches may be placed in multiple in the circuit and at different locations whereby the doors may be operated.

In the foregoing description we have shown the preferred form of our invention, but we do not limit ourselves thereto since many modifications may be made therein without departing from the spirit of the appended claims.

What we claim is:

1. A wardrobe or the like, doors thereto arranged in pairs; means operable to open and close said doors; said means including a spring actuated detent interconnecting parts of the operating means operable, when a predetermined pressure is exerted against one of said doors of the pairs in opposition to the operating means, to release the corresponding doors, of each pair, from the operating means.

2. A wardrobe or the like, doors thereto pivotally mounted for oscillation; means interconnecting said doors; a motor driven means associated with said interconnecting means operable to move said doors to or from the closed position; releasable connecting means whereby said door interconnecting means and motor driven means are operatively joined together; said connecting means having interconnecting parts that positively interlock to drive the doors in one direction and disconnect under a predetermined load when driven in the opposite direction.

3. A wardrobe or the like, doors thereto pivotally mounted for oscillation; means interconnecting said doors; motor driven means operable to move said interconnecting means; said motor driven means and connecting means having an interconnecting spring detent formed and positioned to positively drive said door interconnecting means in one direction and to be disconnected when driving in the opposite direction when the load exceeds a predetermined amount.

4. A wardrobe or the like, doors thereto pivotally mounted for oscillation; means interconnecting said doors; motor driven means operable to move said interconnecting means; said motor driven means and connecting means having an interconnecting spring detent formed and positioned to positively drive said door interconnecting means in one direction and to be disconnected when driving in the opposite direction when the load exceeds a predetermined amount; said interconnecting spring detent having an adjustable member to vary the predetermined load of disconnection.

5. A wardrobe or the like, doors thereto arranged in pairs and separately mounted for oscillation; means operable to move said doors to and from the closed position, said means having a resilient interconnecting detent whereby some of said doors may be stopped at any point in their path of travel from the closed position as said operating means continues in its operation to move other of said doors.

6. A wardrobe or the like; doors thereto arranged in pairs and independently mounted for oscillation; means operable to move said doors to and from the closed position, said means having automatic release means whereby corresponding doors of each pair may remain in the entirely open position as the other doors of the pairs are moved to the closed position.

7. A wardrobe or the like, doors thereto arranged in pairs and independently mounted for oscillation; motor driven means operable to move said doors to and from the closed position, said driving means including pressure actuated detents operable to preclude movement of certain of the doors by said moving means when a predetermined resistance in opposition to said moving force is exerted against any of said doors as they are traveling from the closed position said moving means being adapted to continue to move the remaining doors not being opposed.

8. In a wardrobe or the like, having a series of doors thereto arranged in pairs, each door being pivotally mounted for oscillation, with adjoining doors of different pairs movable toward each other when approaching their open position; apparatus interconnecting all of said doors; motor driven means to actuate the interconnecting apparatus for moving the doors to and from a closed position; and structure establishing connection between the interconnecting apparatus and motor driven means to automatically break connection between the two upon opposing the opening movement of one of the doors of each of said pairs, said connecting structure being held against breaking connection as the doors are moved toward the closed position.

9. In a wardrobe or the like having a series of doors thereto arranged in pairs, each door being pivotally mounted for oscillation, with adjoining doors of different pairs movable toward each other when approaching their open position; apparatus interconnecting all of said doors; motor driven means to actuate the interconnecting apparatus for moving the doors to and from a closed position; and structure establishing connection between the interconnecting apparatus and motor driven means to automatically break connection between the two upon opposing the opening movement of one of the doors of each of said pairs, said connecting structure being held against breaking connection as the doors are moved toward the closed position, one door of each pair being a positively actuated door both as regards opening and closing.

CHARLES H. KRAFT.
ROY E. GEARHART.